United States Patent [19]

Schattmaier

[11] Patent Number: 4,613,172
[45] Date of Patent: Sep. 23, 1986

[54] RELEASABLE PLUG-IN SOCKET PIPE COUPLING

[75] Inventor: Kurt Schattmaier, Zürich, Switzerland

[73] Assignee: Cejn AG, Zug, Switzerland

[21] Appl. No.: 745,222

[22] Filed: Jun. 17, 1985

[30] Foreign Application Priority Data

Jul. 10, 1984 [CH] Switzerland .................. 03330/84

[51] Int. Cl.⁴ .......................................... F16L 19/08
[52] U.S. Cl. .................................. 285/340; 285/308; 285/320; 285/369; 285/902
[58] Field of Search ............... 285/340, 320, 308, 317, 285/369, DIG. 3

[56] References Cited

U.S. PATENT DOCUMENTS

| | | | |
|---|---|---|---|
| 2,805,873 | 9/1957 | Brennan et al. | 285/317 |
| 3,837,687 | 9/1974 | Leonard | 285/340 X |
| 3,884,508 | 5/1975 | Jones | 285/340 X |

FOREIGN PATENT DOCUMENTS

| | | | |
|---|---|---|---|
| 717875 | 9/1965 | Canada | 285/340 |
| 2501823 | 7/1975 | France | 285/340 |

Primary Examiner—Richard J. Scanlan, Jr.
Attorney, Agent, or Firm—Walter C. Farley

[57] ABSTRACT

In a releasable plug-in socket coupling for one or more pipes or pipe elements sealingly insertable into a socket member, an annular groove-like chamber is provided for receiving a retaining element in the front area of the socket member.

The retaining element, comprising individual, segmental portions, is held in the chamber by an elastic retaining ring. Each portion is tiltably supported with a correspondingly constructed top portion in the outer circumferential surface of the chamber and has on the side facing the pipe end surface a base portion provided with a first cutting edge and a second cutting edge spaced therefrom.

An axially removable release ring is in operative connection with the retaining element so that when the release ring is axially displaced, the ring pivots the tiltable portions into the release position.

11 Claims, 9 Drawing Figures

RELEASABLE PLUG-IN SOCKET PIPE COUPLING

BACKGROUND OF THE INVENTION

The invention relates to a plug-in socket coupling for pipes or pipe elements, comprising a socket member receiving at least one pipe end and which has in its interior, a radially inwardly directed projection, at least one circular groove for a packing, a passage opening and a chamber for a retaining element fixing the pipe end which can be inserted up to the projection.

SUMMARY OF THE INVENTION

An object of the invention is to provide a releasable plug-in socket coupling, which ensures a liquid-tight and gas-tight, releasable coupling of the pipe ends in all the pressure ranges admissible for the pipeline or for the pipe end, as well as under all possible loading conditions, e.g. under vibration or pulsation loading. A further object is to fulfill this requirement, even when the plug-in socket coupling is dismantled several times and reassembled again.

Briefly described, the invention comprises a socket coupling for tubular elements including a socket member for receiving a pipe end which has a radial inward projection on its interior and at least one circular groove for a packing, the projection having a passage opening therethrough up to which the pipe end can be inserted. A chamber in the socket receives a retaining element which comprises a plurality of individual segmental portions adapted to substantially surround the inserted pipe end, the segments being held in the chamber under pretension by an elastic retaining ring. Each segment is tiltably supported with a top portion on the outer circumferential surface of the chamber and each portio is provided on the side facing the pipe end surface with a base portion having at least one cutting edge. An axially removable release ring is arranged in operative relationship with the retaining element such that axial displacement of the release ring causes the tiltable portions to pivot into a release position.

The plug-in socket coupling according to the invention on the one hand ensures an accurate centering and sealing of the pipe end in the socket member passage opening and on the other hand an optimum anchoring of the pipe end on the principle of the pressure-dependent wedge action. In addition, this socket coupling is releasable in any assembly position and when fitting has taken place again, it is not possible to fit the socket member incorrectly with respect to the release mechanism. The coupling satisfies high safety requirements.

Tests have shown that in the case of extremely high pressures, e.g. even those exceeding the admissible pressures, the inserted pipe end is subject to a slight surface deformation, but there was no deterioration to the seal and anchoring. In this connection, the separate arrangement of sealing members with respect to the retaining members also proved advantageous. Without impairing the handling of the release mechanism, the plug-in socket can be fitted in the immediate vicinity of e.g. walls.

A further advantage of the coupling according to the invention is that the retaining members can be easily released without damaging the pipe surface, e.g. by means of a screwdriver and consequently the pipe end can be dismantled and then fitted again at the same annular notch point caused by the wedge action.

BRIEF DESCRIPTION OF THE DRAWINGS

An embodiment of a releasable plug-in socket according to the invention is described in a non-limitative manner hereinafter relative to the drawings, wherein.

DETAILED DESCRIPTION OF THE INVENTION

Figure 1:
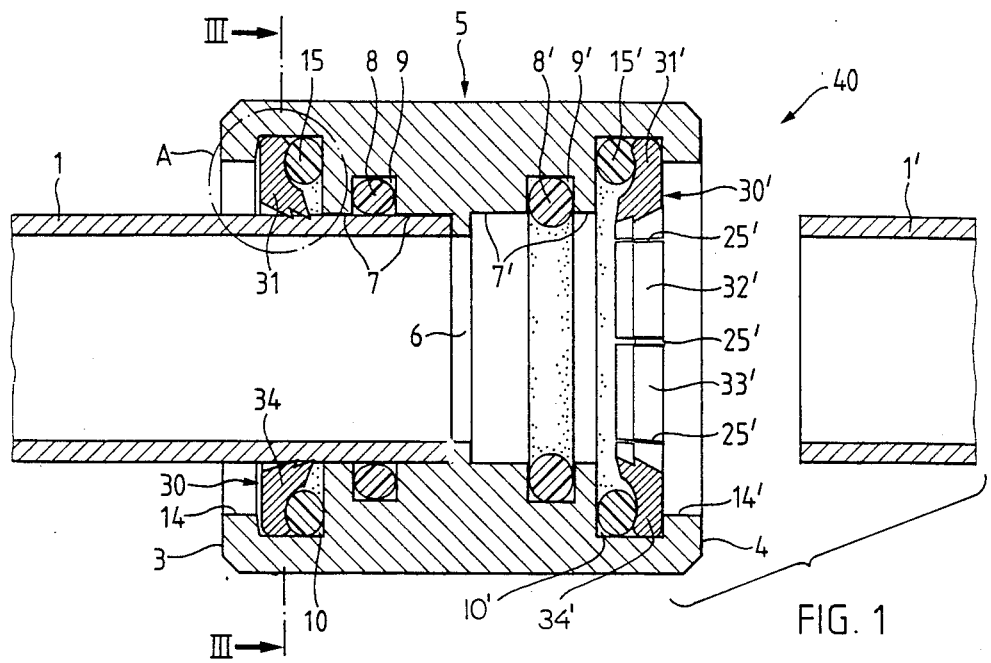
FIG. 1 is a longitudinal section in the plane of symmetry through the plug-in socket coupling without showing the release mechanism, for two pipelines arranged coaxially.

FIG. 1 shows a variant of a plug-in socket coupling 40 for a liquid-tight and gas-tight connection of two pipelines arranged with the same axial direction and it is possible to see pipe end 1 in the inserted state, as well as the other pipe end 1' in the noninserted state. The plug-in socket coupling 40 essentially comprises a socket member 5 and positioned therein packings 8, 8', retaining elements 30, 30' and retaining rings 15, 15' for the said retaining elements.

The preferably cylindrical socket member 5 is traversed by a passage opening 7, 7', which is subdivided by a radially inwardly directed projection 6, which serves as a stop. Viewed in the axial direction, an annular groove 9, 9' for packings 7, 8' is provided in spaced manner on either side of projection 6. Package openings 7, 7' is constructed as a widened opening 14, 14' on the face 3 and back 4 of socket member 5. Viewed in the axial direction, opening 14, 14' is followed by in each case one circular groove-like chamber 10, 10', which serves to receive the retaining elements 30, 30' and the retaining rings 15, 15'. The retaining elements 30, 30' comprise individual segmentally constructed portions 31 to 36 and 31' to 36', which in the assembled, fitted state, constitute the annular retaining element largely embracing the pipe end.

Figure 3:
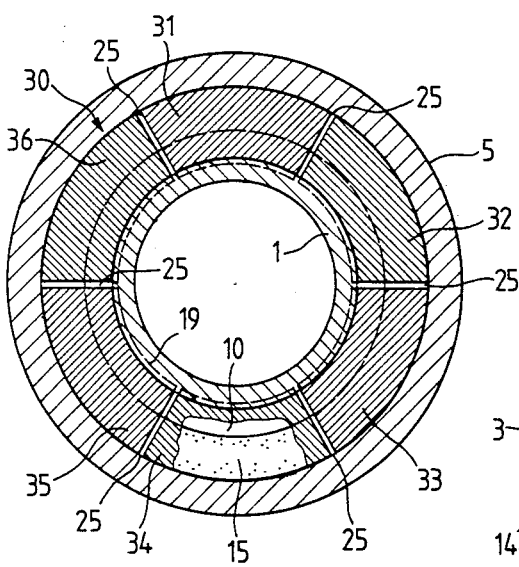
FIG. 3 is a section along line III—III of FIG. 1.

FIG. 3 shows a section along line III—III of FIG. 1 through the retaining element 30 and it is possible to see the individual, preferably uniformly peripherally distributed portions 31, 32, 33, 34, 35, 36, spaced from one another by the relatively small slits 25, as well as pipe end 1 and socket member 5. After retaining ring 15 has been inserted in chamber 10, portions 31 to 36 are individually and successively inserted, the individual portions being prevented from falling out by the completely fitted retaining ring. For illustration purposes, FIG. 3 shows the lower portion 34 of the retaining element in broken away form and it is possible to see in part the all-round retaining ring 15 and chamber 10.

It is pointed out at this point, that the retaining element 30' with the portions 31', 32', 33', 34', 35', 36' separated from one another by slits 25' is constructed in the same way as retaining element 30 of FIG. 3.

Figure 2:
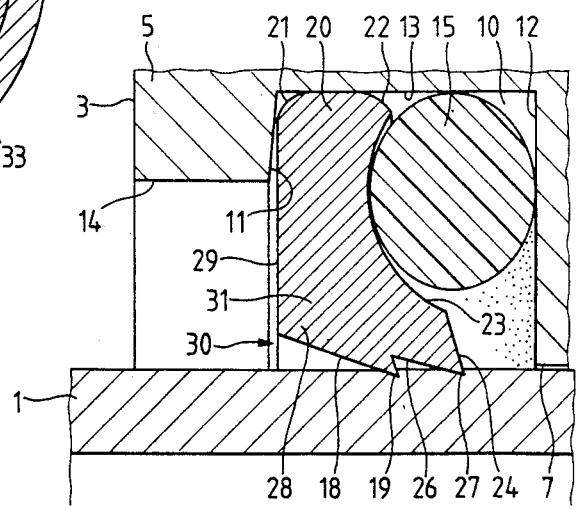
FIG. 2 is a larger scale sectional detail of point A indicated by the circle in FIG. 1.

FIG. 2 shows on a larger scale and in section point A indicated by a circle in FIG. 1 and portion 31 of retaining element 30 arranged in recess 10, together with retaining ring 15 are visible. Retaining ring 15 is preferably made from an elastic, deformable material. The chamber 10 for receiving the retaining element and the retaining ring has an annular contact surface 12, oriented substantially at right angles to passage opening 7, together with an outer circumferential surface 13 for retaining ring 15. On the side facing contact surface 12 is provided a shoulder 11 connected onto opening 14. Towards face 3, the shoulder preferably slopes away in a uniform manner and serves as a contact surface for the annular retaining element 30.

Portion 31 of retaining element 30 shown in cross-sectional form as an embodiment in FIG. 2 has a top portion 20, a base portion 28, a face 29 associated with shoulder 11 and a back 24 associated with retaining ring 15. Back 24 slopes uniformly from base portion 28 to top portion 20 at an angle of approximately 15° and is provided with a recess 23 corresponding to retaining ring 15. Recess 23 acting as a rolling surface in the assembled state of the retaining element preferably has an arcuate shape, the radius of the recess being larger than the radius of the retaining ring 15 (in the unloaded state, the retaining ring has a circular cross-section). The transition of top portion 20 to face 29 is provided with a rounded portion 21 and towards back 24 with a rounded portion 22. Thus, in a predetermined zone, bounded on one side by the sloping shoulder 11 and on the other side substantially by retaining ring 15, the retaining element can be tilted by a short distance in chamber 10, rounded portions 21, 22 ensuring a completely satisfactory rolling on the associated faces 11 and 13.

In the represented embodiment, base portion 28, viewed from the action side, has a first face 26 and a second face 18, which are displaced relative to one another and slope conically, being constructed as cutting edges 27, 19 at the ends. Face 26 emanating from the first cutting edge 27 is preferably somewhat less conically inclined than the face 18 emanating from the second cutting edge 19. The described reciprocal arrangement of the two cutting edges 27, 19 ensures a pressure-dependent, progressive engagement of the cutting edges in the pipe surface, the second cutting edge 19 preventing an excessively deep cut of the first cutting edge 27. The individual portions of retaining elements 30, 30', but particularly the cutting edges are preferably made from hardened tool steel.

Figure 4:
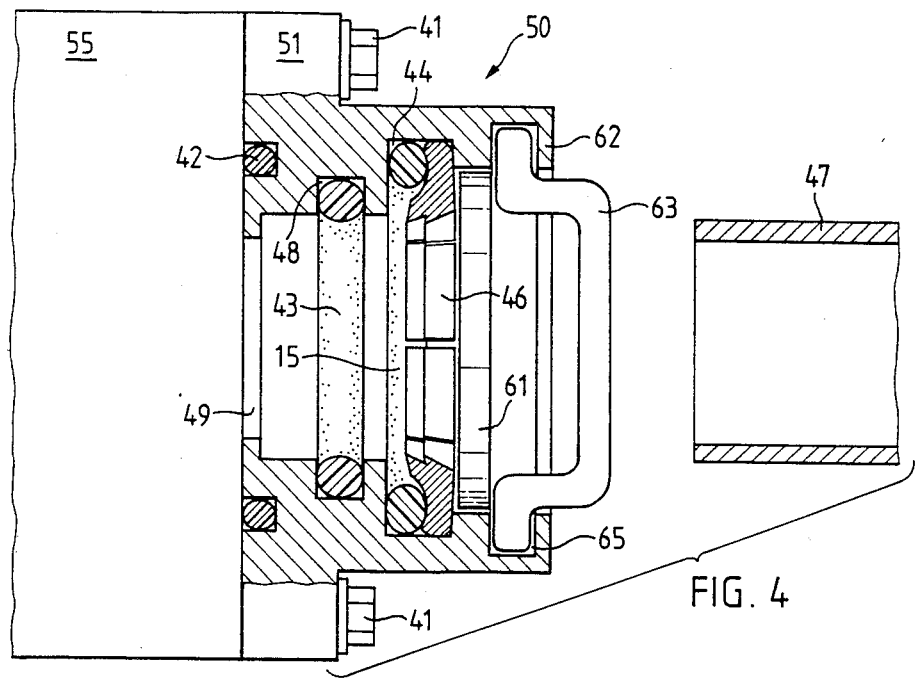
FIG. 4 is an embodiment of the plug-in socket coupling with a release mechanism for one pipe end only.

When the pipe end is not inserted, as is shown e.g. on the right-hand side in FIG. 1 and in FIG. 4, the retaining element comprising the individual portions is pressed against the sloping shoulder of the socket member by the restoring force of the elastic retaining ring. On inserting the pipe end, the individual portions embrace the latter, small diameter differences of the pipe end being compensated in an optimum manner by the individual portions arranged in a tiltable manner in the chamber.

FIG. 4 shows an embodiment of a plug-in socket coupling 50 and it is possible to see a socket member 51 constructed as a flange means with an internal projection 49 for an insertable pipe end 47. Socket member 51 also embraces a packing 43 arranged in an annular groove 48, as well as a retaining element 46, retained by a retaining ring 15 and arranged in a chamber 44. The construction and arrangement of the retaining element 46 assembled from individual portions corresponds to the retaining elements shown on a larger scale in FIGS. 2 and 3. The plug-in socket coupling 50 is attached by screws 41 to a unit 55, such as e.g. to a pump, or a valve or motor block and is preferably sealed by an O-ring 42.

This embodiment, like those described relative to the preceding drawings, is to be provided with the release mechanism shown in FIG. 4 and the following drawings. This release mechanism comprises an anchor ring 62 arranged on the socket opening, with a release frame 63 inserted in the sliding slot 65 of said ring 62. This release frame actuates an axially displaceable release ring 61 which is in turn in operative connection with retaining elements 31 to 36. As a result of its axial displacement against the interior of the socket, release ring 61 causes pivoting of the retaining elements into the release position. The necessary pressure for this is applied to release ring 61, via the lever system of release frame 63. This release mechanism should and must comply with certain safety requirements, whilst particularly ensuring against incorrect fitting of the socket with respect to the release frame. In addition, for safety reasons and for easier handling purposes, the release frame should be independent of the rotary position of the socket. If e.g. a plug-in socket is fitted close to a wall or in the vicinity of the edge of two planes, then as a function of the socket position, the release frame can project towards the wall from the space. In this case, it must be possible to bring the release frame into a correct working position, which is the case with the socket according to the invention.

Figure 5:
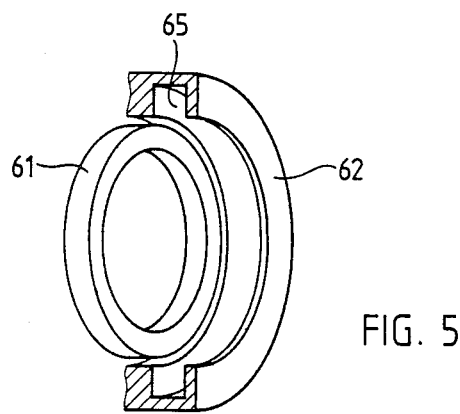
FIG. 5 is a partial perspective view of a portion of the socket and release mechanism.

In a three-dimensional representation, FIG. 5 shows the release ring 61 inserted in the partly cut-away anchor ring 62. In the latter, it is possible to see the sliding slot 65 for the release frame 63. In said sliding slot, the release frame can slide round the pipe inserted in the plug-socket and can be brought into the aforementioned correct working position. The operation of the release mechanism will now be described with the aid of FIGS. 6 to 8.

Figure 6:
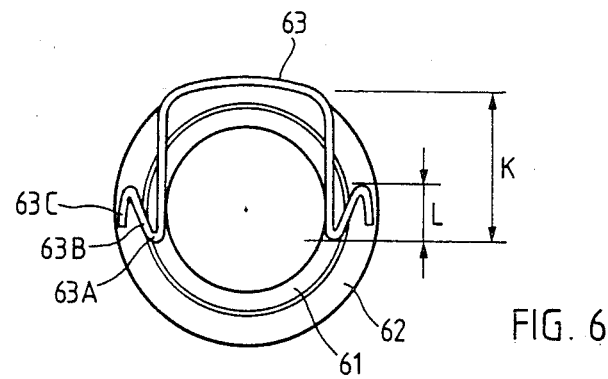
FIG. 6 is a diagrammatic end elevation of the pipe socket of FIG. 4 showing placement of a release lever mechanism.

FIG. 6 shows the projection of the release frame 63 on the release ring 61 on the one hand and the anchor ring 62 on the other. As can be seen from FIGS. 4 and 5, these two rings can be axially displaced relative to one another. Relative displacement in the direction of the plug-in socket is brought about by movement of the release frame and relative displacement in the other direction i.e., out of the socket, is brought about by the resilience of the elastic retaining ring 15. The elastic retaining ring 15 consequently ensures a restoring force in the retaining position of the retaining element comprising portions 31 to 36. The force to release the retaining element from the locked position is brought about by the release frame in the following way. Release frame 63 is a spatially, specially shaped symmetrical double lever with lever portions 63A, 63B, and 63C for transferring the lever action from the frame grip via the load arms 63B acting on release ring 61 to the multi-component retaining element 31.

Figure 7:
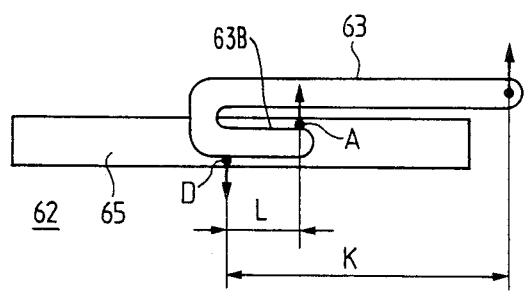
FIG. 7 is a force diagram showing forces exerted by the release lever.

The two-sided, unequally armed lever shown in FIG. 7 and acting as the force-converting means functions in two planes which are substantially orthogonal to one another. The fulcrum point D of the lever system is located on release ring 61, while load point A is positioned in the sense of an anchor point on anchor ring 62. The two force application points are linked via arm 63B. The projection of the force application points to sliding slots 65 shown in FIG. 7 essentially corresponds to the load arm L and the projection of release frame 63 to force arm K. Unlike in the case of the conventional lever, in the case of the release mechanism, the fulcrum point D is axially positionally variable and the load point is axially positionally fixed and radially the two points are displaceable on a circular line. The fulcrum point D can run on a spiral in space in the case of loading. The ratio of load arm L to force arm K remains substantially the same with an increasing pipe diameter. This has advantages, because in the case of larger pipe diameters and consequently necessarily larger sockets, the volume of the retaining ring 15 to be compressed increases, i.e. the lever force to be expended is roughly of the same order of magnitude for all socket sizes. In practice, it has been found that socket couplings of different sizes can easily be detached by means of an average size screwdriver inserted between the socket edge, i.e. anchor ring 62, and the release frame 63. For safety reasons, the release frame must be constructed in such a way that the socket coupling can only be opened with auxiliary tool and not merely with the hand. In no case was there an incorrect assembly, because the pipe to be inserted, as shown in FIG. 6, can only be inserted in one clearly defined position with respect to release frame 63, because the latter cannot be pivoted over and beyond the centre of the pipe. In no case did impediments occur during release, because in the radial plane of the frame, the latter can easily be slid around the inserted pipe and pivoted into the desired position.

Figure 8:
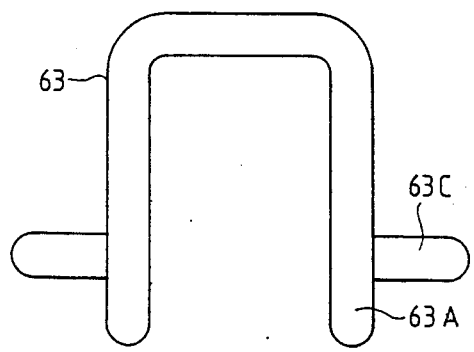
FIGS. 8 and 9 are end and side elevations, respectively, of the release lever.
Figure 9:
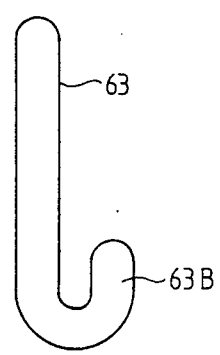

FIG. 8 finally shows the projection of a possible form of the release frame from an end thereof, so that the frame parts 63A, 63B are visible, as well as in FIG. 9, the projection from one side to show frame part 63B. FIG. 6 shows a projection from an end, in which the transitions 63B are extended somewhat and are consequently visible from this position.

A further possibility of defining safety features is linked with the choice of the material for the retaining ring 15 for retaining elements 13. As a function of the degree of elasticity, it is possible to extensively control the release force. Pipe systems which e.g. carry dangerous or corrosive media, should intentionally be difficult to detach and then retaining rings with a high modulus of elasticity are suitable for bringing this about. As the retaining ring is not used for sealing against the medium carried in the pipe, there is no need to take account of a corresponding compatibility. Thus, only the mechanical characteristics of the material have to be taken into account.

What is claimed is:

1. A plug-in socket coupling for pipes or pipe elements, comprising a socket member receiving at least one pipe end and which has in its interior, a radially inwardly directed projection, at least one circular groove for a packing, a passage opening, a chamber, a retaining element in said chamber fixing the pipe end which can be inserted up to the projection, wherein said retaining element comprises individual segmental portions, which largely embrace the pipe end and an elastic retaining ring in the chamber maintaining said segmental portions under pretension, each portion being tiltably supported with a top portion on the outer circumferential surface of the chamber and on the side facing the pipe end surface is provided with a base portion having at least a first cutting edge and wherein an axially movable release ring is arranged in operative connection to the retaining element and which is axially displaceable to pivot the tiltable portions into the release position.

2. Plug-in socket coupling according to claim 1, wherein the release ring is concentrically arranged in an anchor ring connected to the socket, whereby a release frame with a lever system simultaneously acting on the release ring and the anchor ring is placed in the latter.

3. A plug-in socket coupling according to claim 2, wherein the anchor ring has an annular sliding slot for the release frame, in which lever parts of the release frame are inserted.

4. A plug-in socket coupling according to claim 3, wherein the release ring has a lever system which equalizes symmetrical torques, in which the fulcrum point is in operative connection with the release ring and the load point with the anchor ring.

5. A plug-in socket coupling according to claim 4, wherein each portion of the retaining element is provided on the side facing the retaining ring with a back, which uniformly slopes away from the base portion to the top portion.

6. A plug-in socket coupling according to claim 5, wherein the back of each portion uniformly slopes away under an angle of approximately 15°.

7. A plug-in socket coupling according to claim 6, wherein the back of each portion is provided with an arcuate recess corresponding to the curvature retaining ring.

8. A plug-in socket coupling according to claim 7, wherein the radius of the arcuate recess is preferably made larger than the radius of the retaining ring.

9. A plug-in socket coupling according to claim 1, wherein a second cutting edge is provided on each portion and is spaced from the first cutting edge for achieving a pressure-dependent progressive engagement.

10. A plug-in socket coupling according to claim 1, wherein the socket member is constructed as a flange means for an individual pipe end.

11. A plug-in socket coupling according to claim 1, wherein the socket member is constructed as a block for several pipe ends, particularly for pipe ends with different nominal diameters.

* * * * *